US007293292B2

(12) United States Patent
Testardi et al.

(10) Patent No.: US 7,293,292 B2
(45) Date of Patent: Nov. 6, 2007

(54) METHOD AND SYSTEM FOR SECURELY AND SELECTIVELY PROVIDING OPTIONAL FEATURES OR PREMIUM FUNCTIONALITY IN A PRINTER

(75) Inventors: Stephen L. Testardi, Boise, ID (US); Joseph Savola, Boise, ID (US); Virginia K. Capps, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 970 days.

(21) Appl. No.: 09/957,212

(22) Filed: Sep. 19, 2001

(65) Prior Publication Data

US 2003/0053815 A1 Mar. 20, 2003

(51) Int. Cl.

| | |
|---|---|
| ***G06F 7/04*** | (2006.01) |
| *G06F 11/30* | (2006.01) |
| *G06F 12/14* | (2006.01) |
| *G06F 13/00* | (2006.01) |
| *H04L 9/32* | (2006.01) |
| *G06K 19/00* | (2006.01) |
| *G09C 3/00* | (2006.01) |
| *G09C 5/00* | (2006.01) |

(52) U.S. Cl. ............................ 726/30; 726/17; 726/18; 726/19; 726/30; 726/4; 726/5; 726/6; 380/55; 380/243; 380/244; 380/246; 713/189; 713/193; 713/194

(58) Field of Classification Search ................ 380/221, 380/243–246, 54–55; 712/208–209, 37; 395/112; 705/50, 60; 358/1.1
See application file for complete search history.

(56) References Cited

U.S. PATENT DOCUMENTS

| | | | | |
|---|---|---|---|---|
| 5,251,289 | A * | 10/1993 | Fidler et al. | 358/1.13 |
| 5,369,709 | A * | 11/1994 | Foreman et al. | 380/51 |
| 6,064,989 | A * | 5/2000 | Cordery et al. | 705/50 |
| 6,308,256 | B1 * | 10/2001 | Folmsbee | 712/209 |
| 6,563,600 | B1 * | 5/2003 | Young | 358/1.5 |
| 6,650,428 | B1 * | 11/2003 | Hernandez | 358/1.13 |
| 6,727,996 | B1 * | 4/2004 | Silverbrook et al. | 358/1.1 |
| 2001/0038462 | A1 * | 11/2001 | Teeuwen et al. | 358/1.15 |

* cited by examiner

*Primary Examiner*—Ayaz Sheikh
*Assistant Examiner*—Longbit Chai

(57) ABSTRACT

A method and system of selectively and securely enabling an added or premium functionality in a printer can be created by transmitting or inputting to the printer an electronic key correlated to the unique serial number stored in that printer. In this way, the key used to activate an added or premium functionality in a particular printer cannot be used to activate the same functionality in any other printer. This prevents the unauthorized activation of added or premium functions in other printers.

37 Claims, 7 Drawing Sheets

METHOD AND SYSTEM FOR SECURELY AND SELECTIVELY PROVIDING OPTIONAL FEATURES OR PREMIUM FUNCTIONALITY IN A PRINTER

BACKGROUND

Computers and computer networks are widely used by most all businesses to keep records, communicate, produce documents and otherwise manage information. Frequently, the work prepared on a computer is preferably rendered into hardcopy form so that it can be stored or sent to another party. For this reason, printers and other printing devices that can render hardcopy documents from computer data are critically important.

There are many different types of printers and printing devices. For example, types of printers include laser printers, inkjet printers, thermal printers, dot matrix printers and others. Printing devices may include plotters, copiers, facsimile machines, multi-function peripherals, etc. As used hereafter and in the appended claims, the term “printer” will be used to refer expansively to all printers and printing devices that output hardcopy documents.

FIG. 1 illustrates a generic printer and its hardware for performing basic and premium functions. In basic operation, the printer (100) receives print job data over a connection (110) with a host computer or computer network (not shown).

The print job data is received by a formatter (104). The formatter (104), which typically incorporates a microprocessor, related programmable memory and a page buffer, analyzes the incoming print job data and formulates and stores an electronic representation of each page that is to be printed. Once a page has been formatted, it is transmitted to the page buffer within the formatter. From the page buffer, the electronic data is fed systematically to the print controller (109).

The print controller (109) drives a print engine (101). The print engine (101) can be of various types depending on the type of printer (100). For example, the print engine may include a laser for a laser printer, an inkjet print head for an inkjet printer, etc. The print engine (101), under the control of the print controller (109) prints the data to a print medium, usually paper.

A print medium handling system will typically pull the paper from a supply tray (103). The paper is then routed (105) to the print engine (101) where printing occurs. The paper may then be transported (106) out of the printer (100) for collection by the printer user. This is the scenario for one-sided or simplex printing.

A typically premium function in printers is the ability to print on both sides of the paper or other print medium. Where this is the case, the paper, after having been printed on one side by the print engine (101) is transported (107) to a duplexing unit (102) rather than being transported (106) out of the printer (100).

The duplexing unit (102) turns and reorients the paper so that the second side of the paper can be printed on. The paper leaves the duplexing unit (102) and is transported (108) back to the print engine (101) where the second side of the paper is printed. Then the paper is transported (106) out of the printer (100) for collection by the user.

SUMMARY

The situation addressed by the present specification involves selling the printer (100) pictured in FIG. 1 as both a one-sided (simplex) and, optionally, a two-sided (duplex) printer. If the printer (100) illustrated in FIG. 1 is sold as a simplex printer, there must be some mechanism to disable the duplexing unit (102) and related paper transport routes (107 and 108). Thus, the printer (100) can function as a simplex printer. However, if the user wishes to convert the printer to a duplex printer, the duplexing unit (102) and related paper transport routes (107, 108) can be enabled to provide duplex printing without the user needing to purchase an entirely new printer.

Presumably, the printer vendor or manufacturer would charge a premium fee for enabling the added functionality of duplex printing. Moreover, simplex vs. duplex printing is merely one example of a premium printer feature that the printer vendor or manufacturer could provide and optionally enable or disable depending on the needs of, and fees paid by, the purchaser or user. Other such features include post-script printing, higher printing speed, better printing resolution, etc.

This optional premium feature scenario provides great flexibility to the printer purchaser or user to obtain only those printer features which are useful to that purchaser or user. The printer manufacturer also benefits from having fewer production lines and stock-keeping units (SKUs) for printers while still providing a full range of product capabilities and features customers may require.

However, the scenario also poses some problems for the printer manufacturer or vendor. Specifically, if it is too easy to enable disabled premium features, dishonest purchasers and users will never pay the vendor or manufacturer for those additional features. Rather, the printer will be purchased in its most basic service mode at the lowest level of the price structure. The user will then, without right or authorization, enable the premium features that the printer has the capacity to provide.

Consequently, there is a need in the art of a system and method of securely controlling the premium features enabled in a printer that has the necessary hardware to provide those premium features.

The present specification is directed to and includes a method of selectively enabling a premium functionality in a printer by communicating an electronic key to the printer where the electronic key is correlated to a unique serial number stored in the non-volatile memory of the printer. A method according to the present specification may also include authenticating the electronic key by testing the relationship between the key and the serial number and enabling the premium functionality in the printer only upon successful testing of the relationship between the key and the serial number.

The electronic key is preferably generated with a mathematical algorithm that uses the serial number as an input. In such a case, authenticating the electronic key upon receipt in the printer may be performed by reversing the mathematical algorithm and inputting the electronic key to obtain the serial number as a result from the reversed mathematical algorithm.

A method according to the present specification may also include communicating the electronic key to the printer electronically. Alternatively, the method may include communicating the electronic key to the printer by inputting the key with a user input device on the printer.

A method according to the present specification may also include enabling the premium functionality based on receipt of the electronic key for a limited time or for a limited number of uses.

The present specification also encompasses any system for performing the exemplary method described above. For example, the present invention encompasses a system for selectively enabling a premium functionality in a printer that includes: an electronic key that bears a relationship to a unique serial number stored in non-volatile memory of the printer; and a processor in the printer connected to the non-volatile memory. The processor authenticates the electronic key by testing the relationship between the key and the serial number and enables the premium functionality upon successful authentication of the electronic key.

This system may further include a computer system for generating the electronic key and an electronic connection to the printer over which the electronic key is communicated to the printer. The processor may enable the premium functionality based on receipt of the electronic key for only a limited time or a limited number of uses.

As before, in a preferred embodiment, the premium functionality is duplex printing.

BRIEF DESCRIPTION OF THE DRAWINGS

The accompanying drawings illustrate preferred embodiments of the present invention and are a part of the specification. Together with the following description, the drawings are used to demonstrate and explain the principles of the present invention.

Throughout the drawings, identical elements are designated by identical reference numbers.

DETAILED DESCRIPTION OF THE PREFERRED EMBODIMENTS

The present invention provides a method and system of selectively and securely enabling an added or premium functionality in a printer by transmitting or inputting to the printer an electronic key related or correlated to the unique serial number stored in that printer. In this way, the key used to activate an added or premium functionality in a particular printer cannot be used to activate the same functionality in any other printer having a different serial number. This prevents the unauthorized activation of added or premium functions in other printers.

Using the drawings, the preferred embodiments of the present invention will now be explained.

Figure 1:
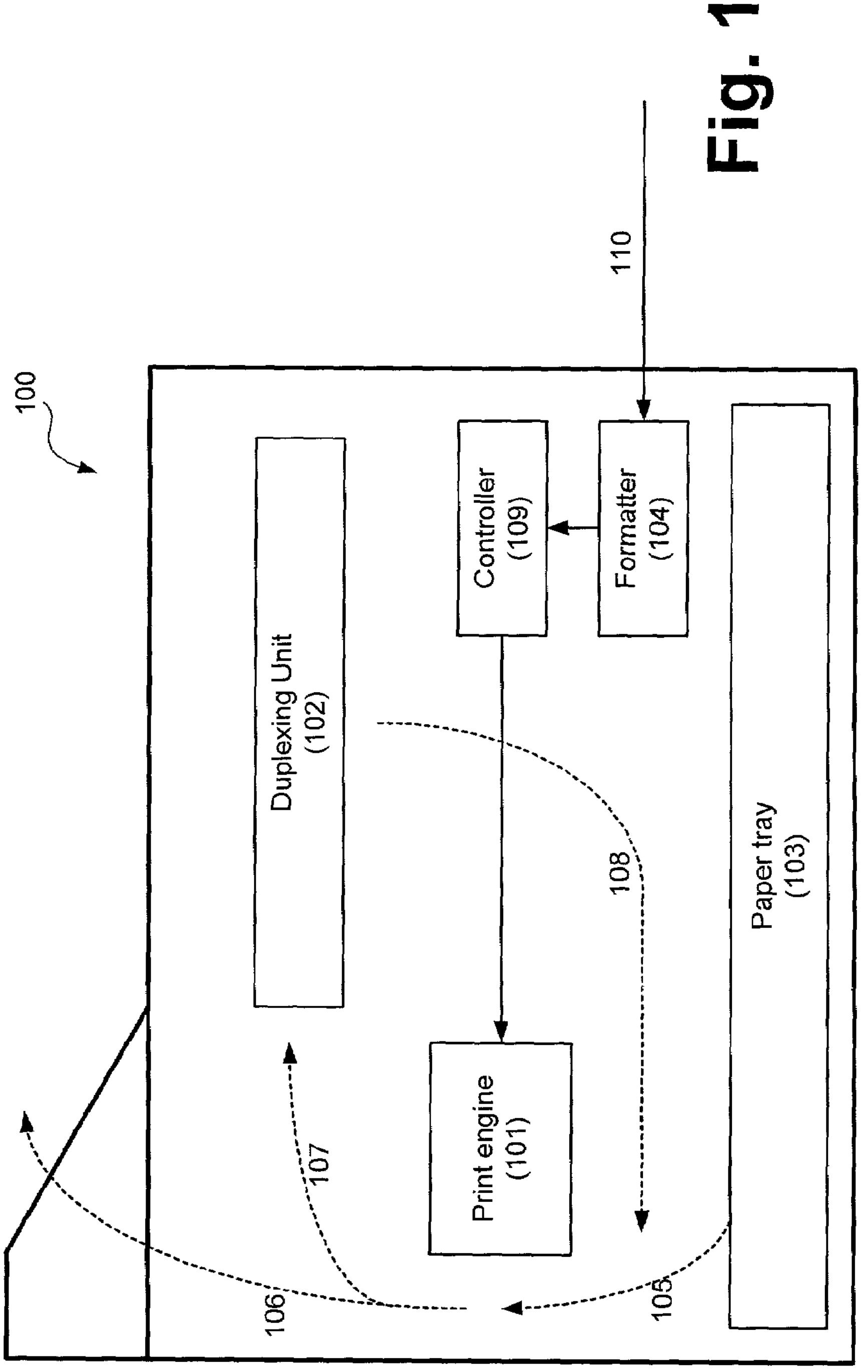
FIG. 1 is an illustration of a printer that provides both basic and premium functionality and is a printer with which the present invention can be practiced.
Figure 2:
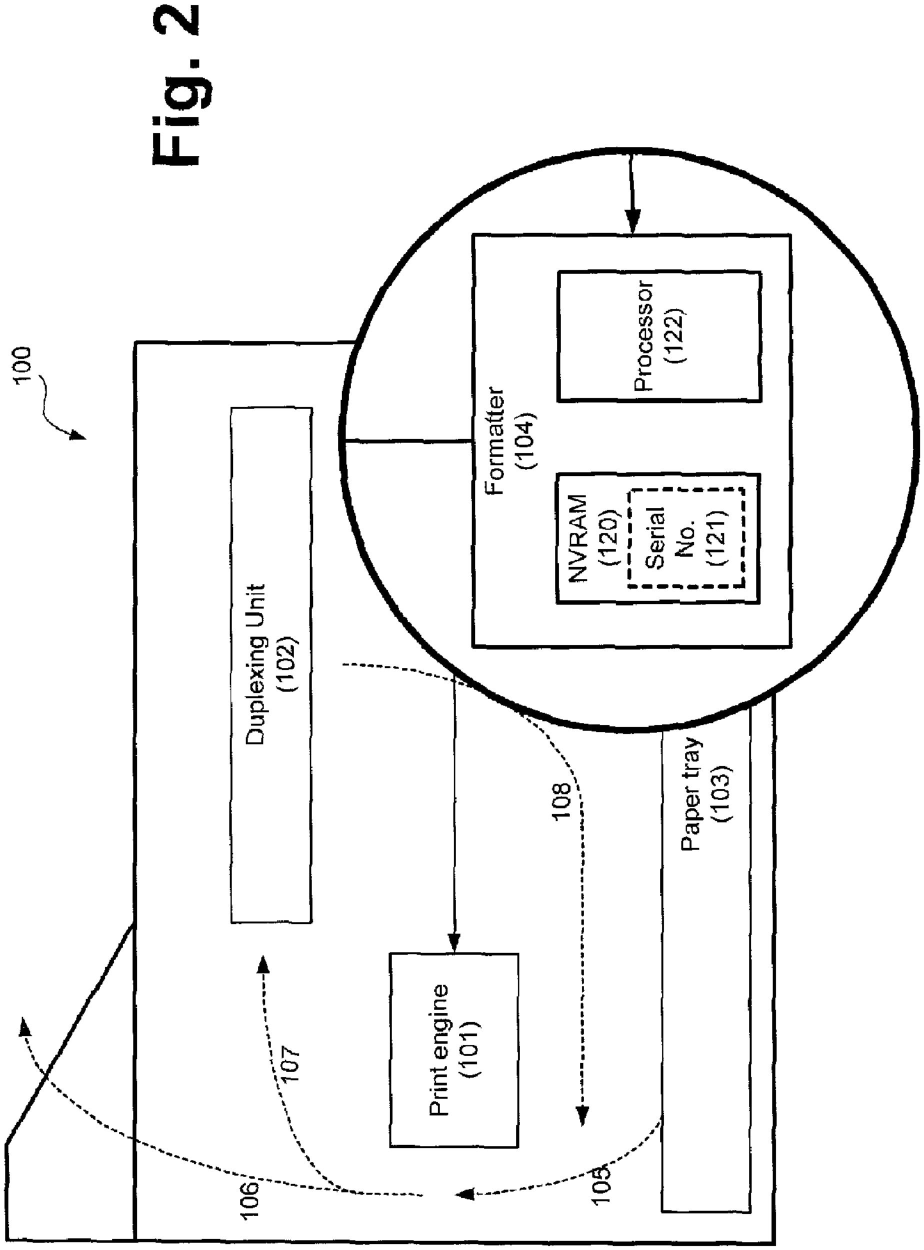
FIG. 2 is an illustration of a printer according to principles of the present invention with an enlarged view of the printer's formatter.

FIG. 2 is an illustration of a printer according to principles of the present invention with an enlarged view of the printer's formatter. The example illustrated in FIG. 2 builds on the example of FIG. 1 in which a printer (100) is built with the capacity for duplex, i.e., two-sided, printing. This is the premium functionality of the printer (100) that is selectively enabled.

Initially, the printer (100) has only simplex (i.e., one-sided printing) enabled. The present invention provides a secure means of selectively enabling the duplex printing function. Presumably, the duplex printing functionality is enabled upon payment by the purchaser or user of an additional fee for the upgraded functionality.

The enlarged portion of FIG. 2 illustrates the details of the printer's formatter (104) as used by the principles of the present invention. As shown in FIG. 2, the formatter (104) includes a processor (122) as well as various memory units required by the formatting process. Among the memory in the formatter (104) is a non-volatile random access memory unit (NVRAM) (120).

Under the principles of the present invention, each printer (100) made by the manufacturer will be assigned a unique serial number (121). As shown in FIG. 2, this unique serial number (121) is stored in the NVRAM (120). As will be explained in more detail below, the unique serial number (121) is used under the principles of the present invention to securely and selectively enable premium functions in the printer (100).

Figure 3:
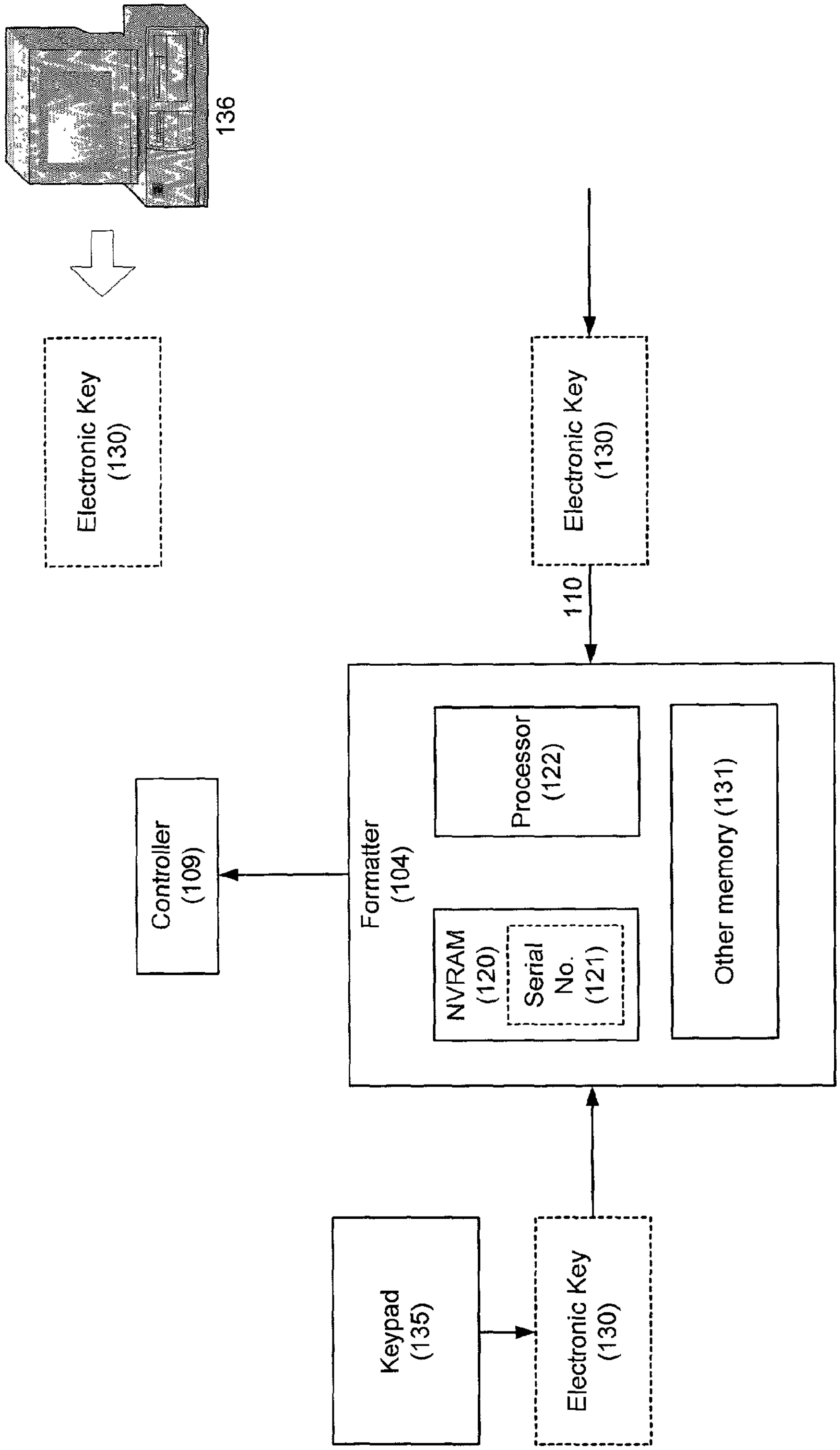
FIG. 3 is an illustration of a printer's formatter and other related components according to principles of the present invention.

FIG. 3 is a further illustration of a printer's formatter and other related components according to principles of the present invention. As shown in FIG. 3, the formatter (104) includes the processor (122), the NVRAM unit (120) storing the printer's unique serial number (121) and other memory (131) such as, for example, a page buffer.

The processor (122) can receive input from at least two sources. First, the processor (122) receives electronic input through the printer's external connection (110). This connection (110) may be with a host computer or computer network. This connection (110) may also include a connection to the Internet, perhaps through a local host computer network. The processor (122) can also receive input from a user input device, such as a keypad (135), on the printer (100).

Under the principles of the present invention, when a user or purchaser of the printer (100) wants to enable an additional or premium function, that user or purchaser will contact the printer vendor or manufacturer and indicate a desire for the added functionality. The vendor or manufacturer may charge an additional fee for enabling the premium functionality. This may be done at the original point of sale or subsequently.

The vendor or manufacturer will then look up the serial number (121) for that user's printer (100). The serial number (121) will then be used to generate an electronic key (130) for enabling the requested premium functionality. The lookup table for the printer's serial number and the means for generating the electronic key (130) are, for example, a computer or computerized system (136) maintained by the printer's vendor or manufacturer.

The electronic key (130) is correlated or based on the printer's serial number (121). For example, the electronic key (130) is preferably generated using a mathematical algorithm using the printer's serial number (121) as an input to the algorithm. This may be performed by the computer system (136).

The electronic key (130) is then communicated to the printer (100). This may be done in at least two ways.

As illustrated in FIG. 3, the electronic key (130) may be transmitted to the printer's formatter (104) over the printer's external connection (130). If the printer is connected to a host computer, the electronic key (130) may be input to the host computer and transmitted over the connection from the host computer to the formatter (104) of the printer. The electronic key (130) could be keyed into the host computer or provided on a recording medium such as a floppy disk or CDROM. If the printer is connected to the Internet and, perhaps has an Internet protocol address, the electronic key (130) can be transmitted to the printer via the Internet or some other network. If the printer is connected to a phone line, e.g., if the printer also function as a fax machine, the electronic key can be communicated to the printer via that phone line.

Additionally, the electronic key (130) can be communicated to the user or purchaser of the printer. The user or purchaser can then input the electronic key (130) to the formatter (104) through a keypad (135) or other user input device on the printer.

Under the principles of the present invention, the processor (122) of the formatter (104) will receive the electronic key (130). The formatter (104) will then retrieve the serial number (121) from the NVRAM unit (120). The formatter (104) will then check the correlation between the electronic key (130) and the serial number (121) to verify the authenticity of the electronic key (130). For example, if the electronic key (130) was generated using a mathematical algorithm with the serial number (121) as input, the processor (122) can reverse the algorithm with the electronic key (130) as input, the appropriate algorithm being stored in the non-volatile memory of the formatter (104).

If this reversed algorithm using the electronic key (130) as input yields a serial number (121) that matches the serial number stored in the NVRAM (120), then the electronic key is verified. The added or premium functionality is then enabled by the formatter (104) based on receipt of an authorized electronic key (130). The key (130) may then be stored in NVRAM (120) for future reference as will be described below.

Figure 4:
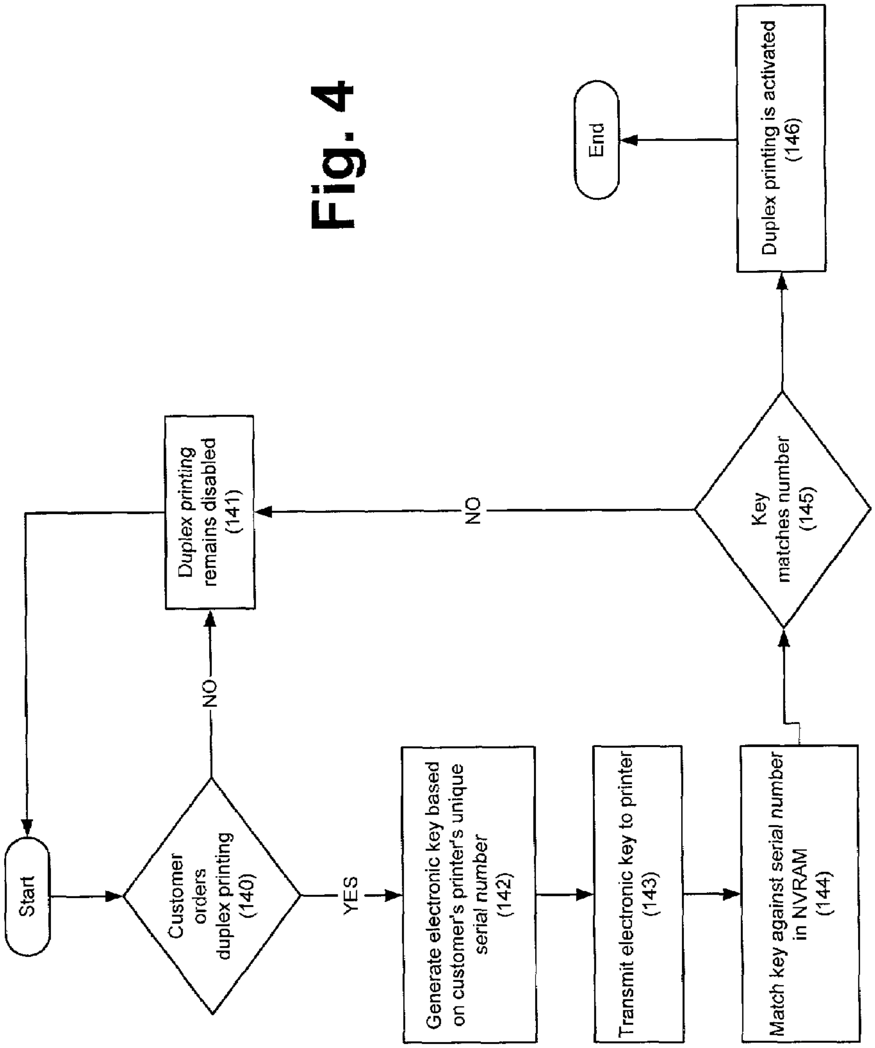
FIG. 4 is a flow chart illustrating an exemplary method of the present invention as applied to selectively providing duplex printing functionality.

FIG. 4 is a flow chart illustrating an exemplary method of the present invention as applied to selectively providing duplex printing functionality. As shown in FIG. 4, the process begins with the customer, the printer purchaser or user, ordering the added functionality of duplex printing (140). If the user never requests duplex printing, the duplex printing functionality in the printer remains disabled (141). Thus, the printer can be sold at a lower base price as a simplex printer.

However, if the user does order or request the added functionality of duplex printing (140), the vendor or manufacturer will generated an electronic key correlated to the unique serial number stored in the printer (142). As described above, this may be done with a mathematical algorithm using the printer's unique serial number as the algorithm input.

The electronic key is then transmitted to the printer (143). As described above, this can be done by inputting the key to a user input device, such as a keypad, on the printer or by transmitting the key to the printer electronically, for example, via the Internet, a local computer network, a host computer or a phone line.

The printer, e.g., the processor of the formatter, will then check the incoming electronic key against the printer's serial number stored in the printer's non-volatile memory (144). The precise method of checking the key against the serial number will depend on how the key is generated in correlation with the serial number. As described above, if the key is generated using a mathematical algorithm with the serial number as input, the key is checked by reversing the algorithm with the key as input to see if the serial number is obtained as the result.

If the key does not match the serial number (145), the duplex printing feature remains disabled (141). However, if the electronic key does match the serial number (145), the key is authenticated and the duplex printing function is enabled (146).

Figure 5:
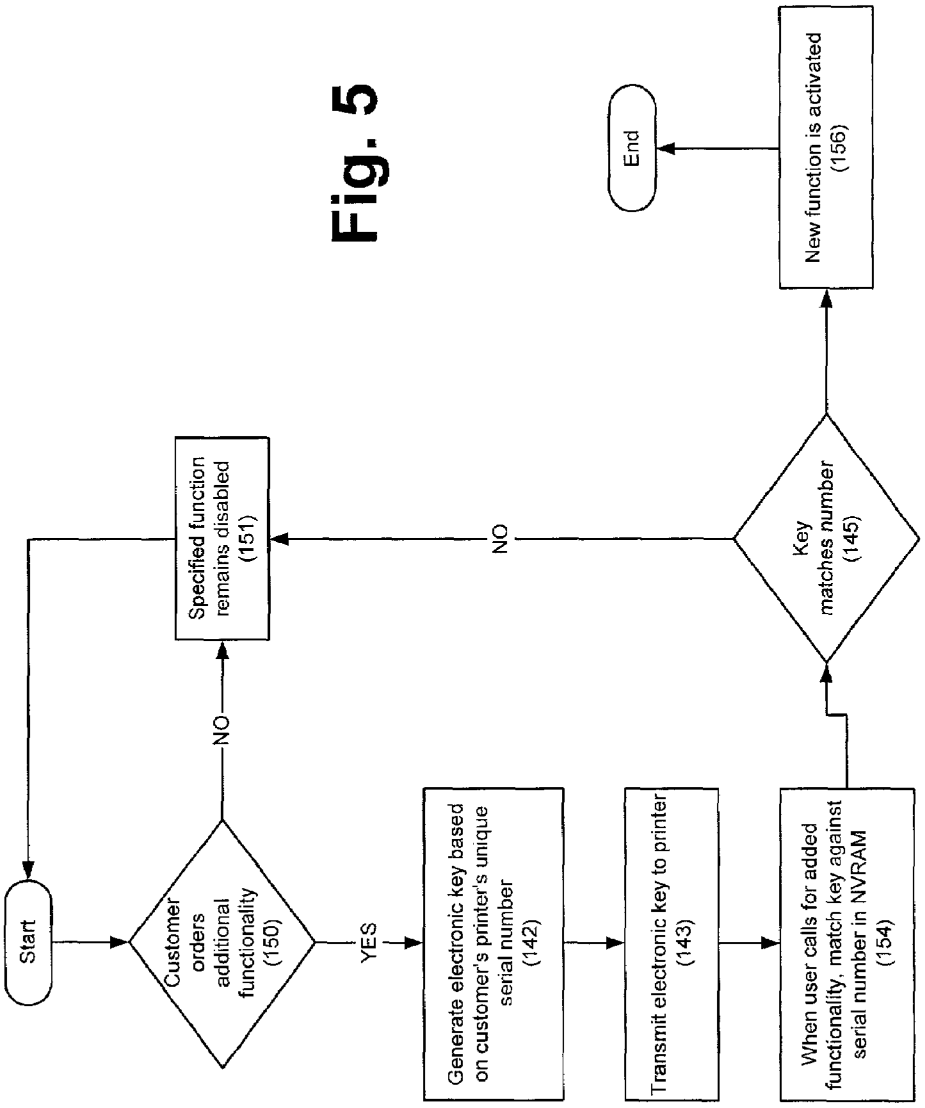
FIG. 5 is a flow chart illustrating a second exemplary method of the present invention as applied to selectively providing a generic premium functionality.

FIG. 5 is a flow chart illustrating a second exemplary method of the present invention as applied to selectively providing a generic premium functionality. The present invention is not limited to selectively enabling a duplex printing function in the printer. Rather, as shown in FIG. 5, the present invention can be applied to selectively and securely enabling any additional or premium function that the printer is physically able to provide. Examples may include faster printing, improved resolution, postscript printing, etc.

As shown in FIG. 5, the process begins with the customer, the printer purchaser or user, ordering the added or premium functionality (150). If the user never requests the additional functionality, that nascent functionality in the printer remains disabled (151). Thus, the printer can be sold at a lower base price as a printer with lesser features or functionality.

However, if the user does order or request the added functionality (150), the vendor or manufacturer will generated an electronic key correlated to the unique serial number stored in the printer (142). As described above, this may be done with a mathematical algorithm using the printer's unique serial number as the algorithm input. Different algorithms may be used to generate keys for different features that can be activated in a particular printer. Such keys would include an indicator of the algorithm to be used to reverse the key into a serial number that can be checked against the number stored in the printer. All possible such algorithms, in reversed form, can be stored in the non-volatile memory of the printer.

After the electronic key is generated, the electronic key is then transmitted to the printer (143). As described above, this can be done by inputting the key to a user input device, such as a keypad, on the printer or by transmitting the key to the printer electronically via, for example, the Internet, a local computer network, a host computer or a phone line.

The system of the present invention can include at least two basic models. First, is the model described in the example of FIG. 4 in which, once an electronic key is received and authenticated, the premium functionality in question is permanently enabled. The example of FIG. 5 presents an alternative model. In the example of FIG. 5, an electronic key is stored in non-volatile memory, with or without authentication. Then, each time a user calls for the added or premium functionality enabled by the key, the presence of the key must be confirmed and the key may or may not be authenticated (154).

So long as an authentic key is stored in non-volatile memory (145), the added or premium functionality is enabled (156) when called. If an authentic key is not stored in the non-volatile memory (145), the functionality becomes disabled (151).

Figure 6:
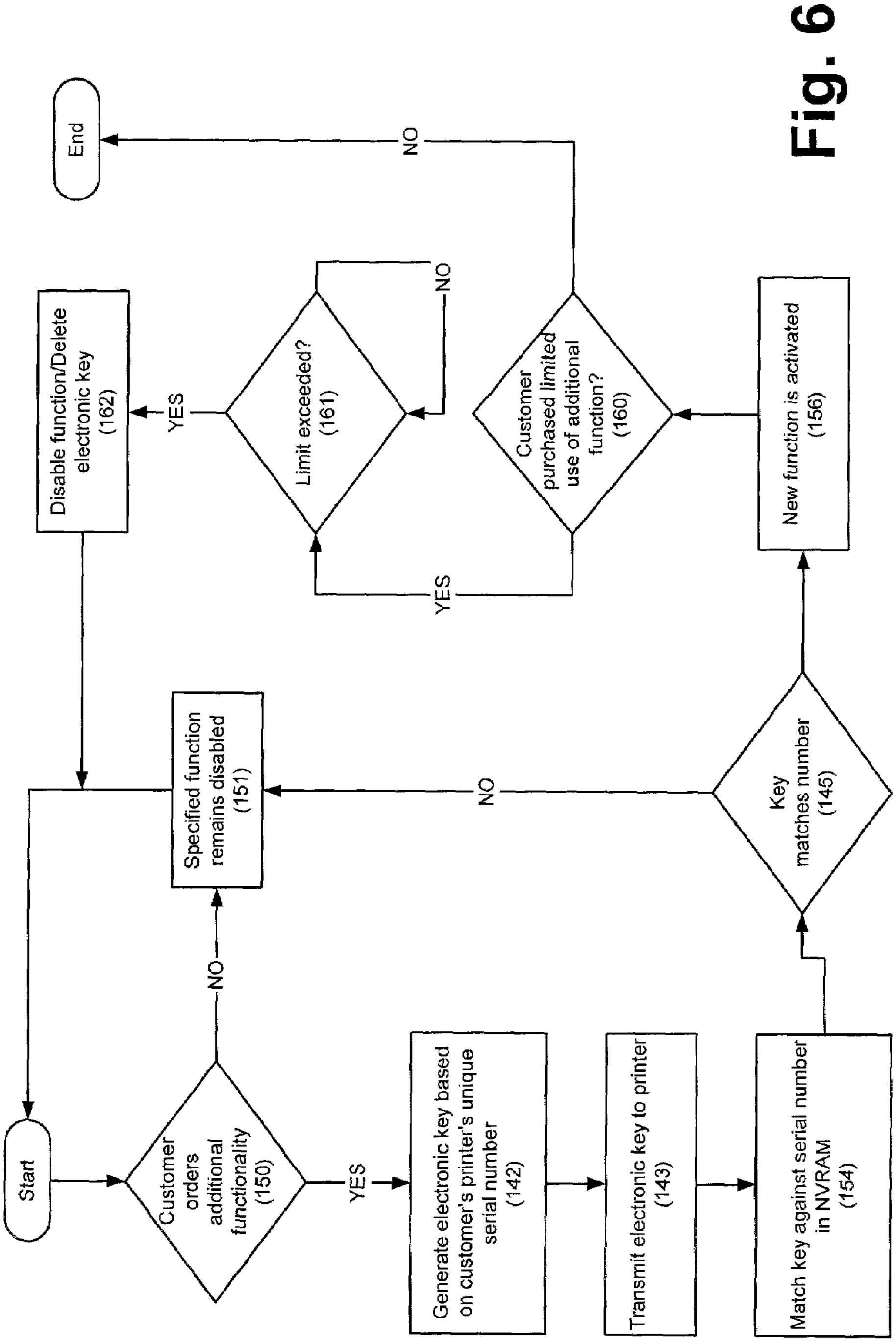
FIG. 6 is a flow chart illustrating a second exemplary method of the present invention as applied to selectively providing a generic premium functionality on a time or use limited basis.

FIG. 6 illustrates another example of a preferred embodiment of the present invention in which a user can have a premium function activated for a limited time or a limited number of uses. As shown in FIG. 6, the process again begins when the user orders an additional or premium functionality (150) in the printer. If the user does not ever make such an order, the additional functionality remains disabled (151).

As in the other examples, when the user orders the additional or premium functionality, an electronic key is generated based on, or related to, the unique serial number for that user's printer (142). The electronic key may be generated, for example, using a mathematical algorithm as described above. The electronic key is then communicated to the printer (143). As noted above, this may be by entering the key to the printer or transmitting the key to the printer electronically.

The key, when received by the printer, is authenticated by matching the key against its relationship with the serial number stored in the printer (154). If the key in some way matches the serial number (145), the new functionality is enabled (156). If not, the added functionality remains disabled (151).

If the new functionality is enabled (156), it may be enabled for a limited time or for a certain number of uses, e.g., for use on a limited number of print jobs (160). In an exemplary pricing model, the user may pay one price for permanent activation of the premium functionality and a lesser price for a temporary or limited activation of the premium functionality.

If the user has enabled the premium function on a limited basis, each time the premium functionality is called, the processor of the printer's formatter will test whether the limit on the temporary enablement of the functionality has been exceed, e.g., whether the time limit on the temporary enablement of the functionality has been exceed or a predetermined number of uses of the temporarily enabled functionality have all been expended (161). If the limit has not been exceed, the functionality remains enabled. If the limit has been exceeded, the functionality is then disabled (162). Disabling the premium functionality may occur by actively disabling the premium function, or by deleting the electronic key in a model where the presence and/or authentication of the key is tested on each call of the premium functionality.

Throughout the life of the printer, there may be times in which the non-volatile memory has be to re-initialized for a variety of reasons. In a model where the electronic key must remain in the non-volatile memory to maintain enablement of the premium functionality, initializing the non-volatile memory will disable the premium functionality by deleting the electronic key from the non-volatile memory.

Figure 7:
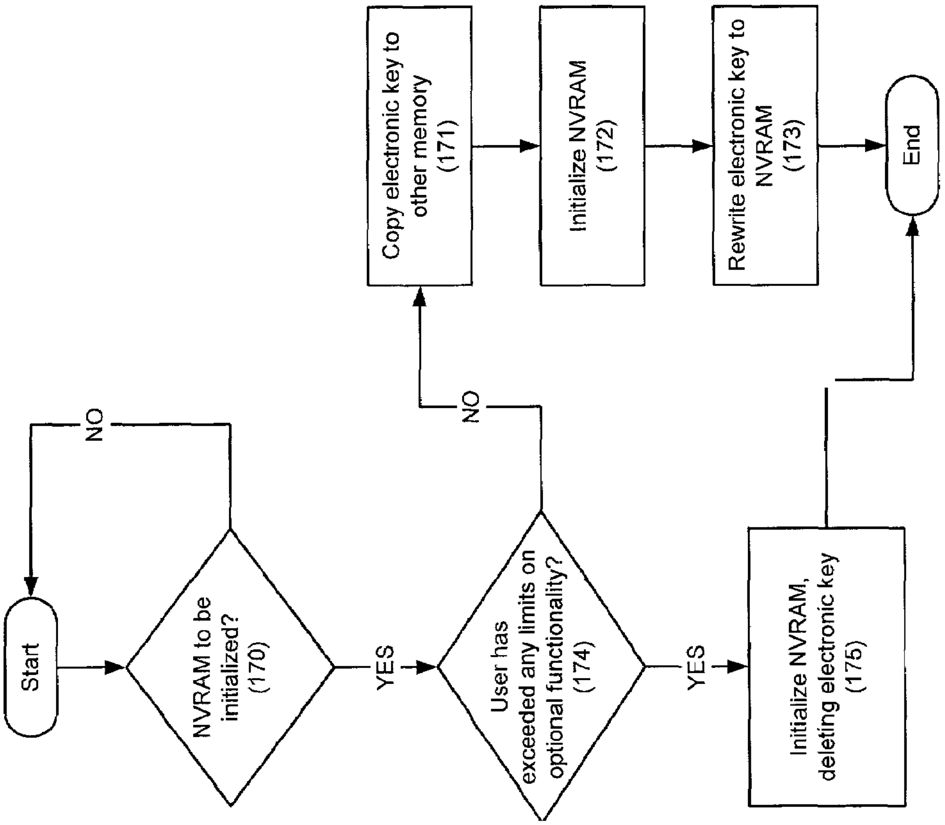
FIG. 7 is a flow chart illustrating an exemplary method of the present invention for managing provision of a premium function supplied on a limited basis.

FIG. 7 is a flow chart illustrating a method of addressing this problem raised by such initialization of the non-volatile memory. When the non-volatile memory needs to be initialized (170), the processor of the formatter may determine if there are any use limits on the enabled functionality and whether those any of limits (e.g., time or number of uses) has been exceeded (174). If any applicable limits have been exceeded, it is not necessary to preserve the electronic key during initialization of the non-volatile memory and the memory can be initialized, thereby deleting the superfluous electronic key (175).

If, however, there are no use limits on the premium functionality or any applicable use limit has not been exceeded, in a model in which the electronic key must remain in the non-volatile memory to keep the premium function enabled, the electronic key is copied to another memory unit, e.g., a page buffer, within the printer (171). The non-volatile memory is the initialized (172). After the non-volatile memory is initialized, the electronic key is the rewritten to the non-volatile memory (173). In this way, the electronic key is maintained in the non-volatile memory even after an initialization of the non-volatile memory.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of selectively enabling a premium functionality in a printer, wherein said printer is configured to provide a basic functionality in addition to said selectively-enabled premium functionality, said method comprising, in addition to operating said printer to provide said basic functionality, communicating an electronic key to said printer to enable said premium functionality, wherein said electronic key is correlated to a unique serial number corresponding uniquely to said printer and stored in non-volatile memory of said printer; and authenticating said electronic key upon receipt in said printer by obtaining and validating the corresponding said unique serial number from said electronic key.

2. The method of claim 1, further comprising enabling said premium functionality in said printer upon successful testing of said correlation between said key and said serial number.

3. The method of claim 1, further comprising generating said electronic key with a mathematical algorithm that uses said serial number as an input.

4. The method of claim 3, further comprising authenticating said electronic key upon receipt in said printer by reversing said mathematical algorithm, inputting said electronic key to obtain said serial number as a result from said reversed mathematical algorithm.

5. The method of claim 1, wherein said communicating said electronic key comprises transmitting said key to said printer electronically.

6. The method of claim 1, wherein said communicating said electronic key comprises inputting said key with a user input device on said printer.

7. The method of claim 1, further comprising enabling said premium functionality based on receipt of said electronic key for a limited time.

8. The method of claim 1, further comprising enabling said premium functionality based on receipt of said electronic key for a limited number of uses.

9. The method of claim 1, wherein enabling said premium functionality further comprises enabling duplex printing in said printer.

10. The method of claim 1, further comprising:

storing said electronic key in an additional memory unit when initializing said non-volatile memory; and copying said electronic key back to said non-volatile memory from said additional memory after said initializing of said non-volatile memory.

11. A system for selectively enabling a premium functionality in a printer comprising:

said printer, wherein said printer is configured to provide a basic functionality in addition to said selectively-enabled premium functionality, said basic functionality being available initially, said premium functionality being available only when enabled;

means for generating an electronic key that bears a relationship to a unique serial number stored in non-volatile memory of said printer;

means for communicating said electronic key to said printer to selectively enable said premium functionality; and means for verifying said electronic key by matching said unique serial number stored in said printer to data derived from said electronic key.

12. The system of claim 11, further comprising:

means for enabling said premium functionality in said printer upon successful testing of said relationship between said key and said serial number.

13. The system of claim 12, wherein said means for enabling said premium functionality further comprise means for enabling duplex printing in said printer.

14. The system of claim 11, wherein said means for generating said electronic key comprises a mathematical algorithm that uses said serial number as an input.

15. The system of claim 11, further comprising means for enabling said premium functionality based on receipt of said electronic key for a limited time or a limited number of uses.

16. A system for selectively enabling a premium functionality in a printer comprising:

said printer, wherein said printer is configured to provide a basic functionality in addition to said selectively-enabled premium functionality, said basic functionality being enabled whenever said printer is active;

an electronic key that bears a relationship to a unique serial number stored in non-volatile memory of said printer; and a processor in said printer connected to said non-volatile memory;

wherein said processor authenticates said electronic key by testing said relationship between said key and said serial number and enables said premium functionality upon successful authentication of said electronic key;

wherein said processor derives said unique serial number from said electronic key and matches the derived serial number to said serial number stored in the non-volatile memory of said printer to authenticate said electronic key.

17. The system of claim 16, further comprising a computer system for generating said electronic key.

18. The system of claim 16, further comprising an electronic connection to said printer over which said electronic key is communicated to said printer.

19. The system of claim 16, wherein said processor enables said premium functionality based on receipt of said electronic key for a limited time or a limited number of uses.

20. The system of claim 16, wherein said premium functionality is duplex printing.

21. The system of claim 16, further comprising an additional memory unit; wherein said processor stores said electronic key in said additional memory unit when initializing said non-volatile memory.

22. A method of selectively enabling a premium functionality in a printer, wherein said printer is configured to provide a basic functionality in addition to said selectively-enabled premium functionality, said method comprising:

in addition to operating said printer to provide said basic functionality, communicating an electronic key to said printer to enable said premium functionality, wherein said electronic key is correlated to a unique serial number stored in non-volatile memory of said printer; and in response to receipt of said electronic key, enabling one or more hardware elements of said printer that support said premium functionality and are otherwise unused by authenticating said electronic key when matching said unique serial number stored in said printer to data derived from said electronic key.

23. The method of claim 22, further comprising authenticating said electronic key by testing a relationship between said key and said serial number.

24. The method of claim 23, further comprising enabling said premium functionality in said printer upon successful testing of said relationship between said key and said serial number.

25. The method of claim 22, further comprising generating said electronic key with a mathematical algorithm that uses said serial number as an input.

26. The method of claim 25, further comprising authenticating said electronic key upon receipt in said printer by reversing said mathematical algorithm, inputting said electronic key to obtain said serial number as a result from said reversed mathematical algorithm.

27. The method of claim 22, wherein said communicating said electronic key comprises transmitting said key to said printer electronically.

28. The method of claim 22, wherein said communicating said electronic key comprises inputting said key with a user input device on said printer.

29. The method of claim 22, further comprising enabling said premium functionality based on receipt of said electronic key for a limited time.

30. The method of claim 22, further comprising enabling said premium functionality based on receipt of said electronic key for a limited number of uses.

31. A system for selectively enabling a premium functionality in a printer comprising:

said printer, wherein said printer is configured to provide a basic functionality in addition to said selectively-enabled premium functionality;

an electronic key that bears a relationship to a unique serial number stored in non-volatile memory of said printer;

a processor in said printer connected to said non-volatile memory; and hardware in said printer that supports said premium functionality and is selectively enabled;

wherein said processor is configured to (1) operate said printer to provide said basic functionality upon receipt of a print job and (2) authenticate said electronic key upon receipt in said printer by verifying said electronic key when matching said unique serial number stored in said printer to data derived from said electronic key and enable said premium functionality by activating said hardware upon successful authentication of said electronic key.

32. The system of claim 31, further comprising a computer system for generating said electronic key.

33. The system of claim 31, further comprising an electronic connection to said printer over which said electronic key is communicated to said printer.

34. The system of claim 31, wherein said processor is configured to enable said premium functionality based on receipt of said electronic key for a limited time.

35. The system of claim 31, wherein said processor is configured to enable said premium functionality based on receipt of said electronic key for a limited number of uses.

36. The system of claim 31, wherein said hardware comprises a duplexing unit.

37. The system of claim 31, further comprising an additional memory unit; wherein said processor stores said electronic key in said additional memory unit when initializing said non-volatile memory.

* * * * *